(12) United States Patent
Reinecke et al.

(10) Patent No.: US 8,173,571 B2
(45) Date of Patent: May 8, 2012

(54) CATALYST FOR THE RECOMBINATION OF HYDROGEN WITH OXYGEN

(75) Inventors: Ernst-Arndt Reinecke, Wuerselen (DE); Inga Maren Tragsdorf, Aachen (DE)

(73) Assignee: Forschungszentrum Juelich GmbH, Juelich (DE)

( * ) Notice: Subject to any disclaimer, the term of this patent is extended or adjusted under 35 U.S.C. 154(b) by 105 days.

(21) Appl. No.: 12/083,390

(22) PCT Filed: Nov. 16, 2006

(86) PCT No.: PCT/DE2006/002009
§ 371 (c)(1),
(2), (4) Date: May 27, 2008

(87) PCT Pub. No.: WO2007/076740
PCT Pub. Date: Jul. 12, 2007

(65) Prior Publication Data
US 2009/0143223 A1    Jun. 4, 2009

(30) Foreign Application Priority Data
Dec. 23, 2005 (DE) .......... 10 2005 061 985

(51) Int. Cl.
*B01J 33/00* (2006.01)
*B01J 21/00* (2006.01)
*B01J 23/00* (2006.01)
*B01J 25/00* (2006.01)
*B01J 29/00* (2006.01)

(52) U.S. Cl. ............ 502/300; 502/2; 502/100; 502/305; 502/313

(58) Field of Classification Search .............. 502/158, 502/2, 100, 300, 305, 313
See application file for complete search history.

(56) References Cited

U.S. PATENT DOCUMENTS

| 3,259,454 | A |   | 7/1966  | Michalko |
|-----------|---|---|---------|----------|
| 3,259,589 | A | * | 7/1966  | Michalko .................. 502/334 |
| 3,397,154 | A |   | 8/1968  | Talsma |
| 4,009,242 | A | * | 2/1977  | Lauder et al. ............. 423/213.2 |
| 5,422,331 | A |   | 6/1995  | Galligan et al. |
| 6,071,482 | A |   | 6/2000  | Brockerhoff et al. |
| 6,333,123 | B1 |  | 12/2001 | Davis et al. |
| 6,784,232 | B1 |  | 8/2004  | Zobel et al. |
| 6,846,775 | B1 | * | 1/2005  | Brockerhoff et al. ......... 422/177 |
| 6,942,846 | B1 | * | 9/2005  | Eckardt et al. ............. 423/437.2 |
| 6,972,337 | B1 | * | 12/2005 | Onimus et al. ............... 549/533 |

FOREIGN PATENT DOCUMENTS

| CH | 483 874    | 1/1970  |
| DE | 197 22 305 | 10/1998 |
| DE | 198 52 953 | 3/2000  |
| DE | 198 52 954 | 5/2000  |
| DE | 199 14 814 | 12/2000 |
| DE | 199 14 823 | 3/2001  |

(Continued)

*Primary Examiner* — James McDonough
(74) *Attorney, Agent, or Firm* — Jordan and Hamburg LLP

(57) ABSTRACT

Large quantities of explosive hydrogen-oxygen mixtures can be produced by leaks or accidents in technical plants, e.g. nuclear reactors. The invention relates to a catalyst, a catalyst system, an arrangement for recombining hydrogen with oxygen, and a method for producing a catalyst. The inventive catalyst is characterized in that the ignition point of the mixture is exceeded under no circumstances even though the catalyst works in a strictly passive manner without outside intervention and the recombination is an exothermal reaction. The basic idea is to design the catalyst such that the catalyst autonomously limits the activity thereof in accordance with the prevailing temperature.

17 Claims, 2 Drawing Sheets

FOREIGN PATENT DOCUMENTS

| EP | 0 670 575 | 9/1995 |
| GB | 11 23 585 | 8/1968 |
| WO | WO-00/60608 | 10/2000 |
| WO | WO-02/01655 | 1/2002 |

* cited by examiner

CATALYST FOR THE RECOMBINATION OF HYDROGEN WITH OXYGEN

BACKGROUND OF THE INVENTION

The invention relates to a catalyst, a catalyst system, an arrangement for recombining hydrogen with oxygen, and a method for producing a catalyst.

Hydrogen is used in large quantities in numerous industrial processes. The main concern when handling hydrogen is the need to avoid ignitable gas mixtures. Mixtures of hydrogen and air are ignitable within a very broad range of concentrations between 4 and 75 vol. % hydrogen. The spontaneous ignition temperature for a hydrogen/air mixture is about 560° C. While the occurrence of ignitable mixtures is avoided during normal technical operations, such mixtures also occur outside of the processes as a consequence of leaks or operational malfunctions. However, in nuclear reactors, hydrogen can also be formed on the order of magnitude of 10,000 standard cubic meters when there are malfunctions involving a core meltdown. With the air oxygen present in the containment vessel, the hydrogen can form an ignitable mixture that represents a threat to the integrity of the containment vessel.

Due to statutory and legal considerations, especially in a nuclear reactor, in case of damage, the exchange of atmospheres must be prevented and the ignitable mixture must be diluted to a safe hydrogen concentration. So-called recombiners are therefore used as safety precautions. They make the mixture leaner in that the hydrogen is converted to water vapor in an exothermal reaction with the air oxygen. These recombiners can contain a catalyst material so that hydrogen and oxygen also react with one another in a safe manner below the ignition temperature.

Due to the enormous heat from recombination, approximately 242 kJ/mol, the recombiner can overheat and thus become the ignition source itself. Therefore, recombiners are frequently used only below the ignition limit of 4 vol. % hydrogen or their performance is limited by installing diffusion barriers. Examples of this are known from K. Ledjeff, "Elimination of hydrogen or oxygen from explosive mixtures by catalytic techniques," International Journal of Hydrogen Energy 1987, Volume 12, No. 5, pages 361-367, and from DE 199 14 814 C1. However, because of this, very explosive and therefore hazardous mixtures remain in the containment vessel for a very long time.

Known from DE 197 22 305 and DE 198 52 953 are technically further developed recombiners having passive heat absorbing and storing elements and cooling systems that are intended to counteract the overheating problem. However, since these elements and systems are not designed for every conceivable case, in these cases, as well, it is not possible to preclude the possibility of overheating with potentially catastrophic consequences.

In addition, a recombiner can be exposed to the ambient atmosphere for very long standing times until its potential employment. During this standing time, disadvantageous contaminants from the environment can contaminate the catalyst so that recombination does not initiate completely without a substantial delay. Recombiners must undergo regular maintenance because of this.

The object of the invention is therefore to provide means with which hydrogen and oxygen can be recombined, it being ensured that the temperature will not under any circumstances exceed a prespecified limiting temperature, regardless of the concentration and homogeneity of the hydrogen. These means should also provide their full capability immediately, even after lengthy standing times.

SUMMARY OF THE INVENTION

This object is inventively attained using a catalyst, a catalyst system, an arrangement, and a method in accordance with the invention including a matrix comprised of a metal oxide and a catalytically active material that supports a recombination of hydrogen with oxygen embedded in the matrix.

In the framework of the invention, a catalyst was found that contains a catalytically active material that supports the catalytic recombination of hydrogen with oxygen. This active material is embedded in a matrix made of a metal oxide. It was found that the recombination rate of this catalyst can limit itself so that the temperature of the catalyst does not exceed a prespecified limiting value, even when there is a large supply of hydrogen or oxygen.

A number of processes must occur so that recombination between hydrogen and oxygen can be maintained over time in the inventive catalyst. For instance, hydrogen must penetrate through the matrix made of metal oxide to the active material. Oxygen must be released from the metal oxide so that it can react with the hydrogen. The used oxygen must re-diffuse within the matrix to the active material and ultimately must also diffuse from outside into the matrix so that the recombination does not cease after just a short period of time due to a lack of oxygen. The speeds of all of the processes that are necessary for maintaining the recombination are a function of temperature. The basic idea of the invention is that only one of these processes must be retarded at an elevated temperature in order to slow the recombination rate. In a reaction cascade of elementary processes, the slowest reaction determines the speed of the entire process.

If such a catalyst is exposed to an atmosphere that contains hydrogen, by recombination it produces heat, at least some of which is given off to the environment. Thus, at a given hydrogen concentration in the atmosphere, a stationary temperature is created that is a balance between heat production and heat drain. It is to be expected that for lower hydrogen concentrations this stationary temperature initially increases as hydrogen concentration increases. However, starting at a certain hydrogen concentration the slowing effect described above prevents the recombination rate, and thus heat production, from increasing further so that in no case does the temperature exceeds a prespecified limiting value. This limiting value can be determined in the catalyst using the design of the matrix and the type and using the quantity of the active material embedded in the matrix.

Thus, particularly in nuclear reactors or other industrial applications, such a catalyst can render harmless large quantities of hydrogen that occur as the result of malfunctions. For this, it must be assured at all times that the ignition temperature of the mixture of hydrogen and air oxygen is not exceeded. However, the malfunction that occurs is the sole factor that determines the supply of hydrogen. In addition, in the worst case it must be assumed that all active devices intended to limit the temperature of or cool the catalyst are not functional due to the malfunction. Even in this worst case scenario, the inventive catalyst does not become warmer than originally indicated.

Particularly in areas in which there is an explosion hazard, such as, for instance, a nuclear reactor after a core meltdown, the inventive temperature-dependent slowing of the recombination rate offers advantages over slowing that is always active, such as can be obtained for instance by using smaller quantities of active material. Since the full recombination rate of the active material is available from the start, significantly more hydrogen is converted compared to a catalyst, with always active limitation of the recombination rate per unit of time without this having a negative impact on the safety of the system. Because of this, in particular gas mixtures for which there is an explosion hazard, they are rendered leaner, to below the explosion limit, as rapidly as possible. In contrast, if a catalyst is used that has a limit that is always active, valuable time is lost while the acute explosion hazard continues.

By using an appropriate amount of inventive catalysts to which the quantities of hydrogen to be converted can be distributed, hydrogen can be converted at a prespecified recombination rate with the additional secondary condition that a prespecified maximum temperature is not exceeded.

In one particularly advantageous embodiment of the invention, the matrix made of the metal oxide is only permeable for hydrogen. This ensures that even during extended standing times no catalyst contaminants travel out of the environment to the active material. The service life of the catalyst is thus significantly enhanced, in particular, when there is only sporadic operation. In addition, it is assured that the recombination will begin rapidly since it is not necessary to first remove deposits from the catalyst. This is especially important when the catalyst is used only when there is a malfunction but the security of the system depends on it.

In one particularly advantageous embodiment of the invention, the metal oxide is molybdenum trioxide, $MoO_3$. The crystal lattice for molybdenum trioxide possesses an intercalating ability for molecular hydrogen that decreases as temperature increases. Surprisingly, this also appears to limit the hydrogen supply from the active material to the catalytically active centers. Apparently the hydrogen is not directly adsorbed from the gas phase onto the active material and thus there is also no direct oxidation. Since the recombination rate decreases with the temperature-dependent hydrogen concentration in the crystal lattice of the molybdenum trioxide, the recombination rate limits itself in the inventive sense as the temperature increases. In addition, molecular hydrogen also spontaneously intercalates itself below 20° C. into the crystal lattice of molybdenum trioxide, so that even at room temperature the recombination reaction begins rapidly. Other molybdenum oxides are also suitable, however.

The active material is advantageously a noble metal, in particular, a noble metal from the group platinum, palladium, rhenium, rubidium, rhodium, and iridium. As is known, these noble metals promote the reaction between hydrogen and oxygen and are therefore comparatively insensitive to contamination by foreign substances from the environment.

The inventive catalyst is advantageously a body that can be flowed through. Such a body has an input and an output. Gas containing hydrogen is supplied to it through the input. A gas having a lower hydrogen content flows out of it at the output.

A body that can be flowed through that is a catalyst can be integrated, for instance, into a pipe. Because the body has a large surface area, the heat that occurs during the recombination is effectively removed so that a large quantity of hydrogen per unit of time can be converted at a prespecified limiting temperature. Porous bodies and filler material made of ceramic and metallic materials are suitable as bodies that can be flowed through. When used according to the principle of free convection, they ensure adequate flow and/or circulation, that is, high mass transfer coefficients and heat transmission coefficients with low pressure losses, and ensure intensive contact between the supplied atmosphere and the matrix with the active material.

The body that is flowed through can comprise the metal oxide matrix, so that it is particularly simple to produce on a large scale. Alternatively, however, it can be coated with the metal oxide matrix. In this manner the body itself can comprise a cost-effective and mechanically strong basic material.

The body that can be flowed through advantageously has a honeycomb-like structure. This maximizes the surface area it has available for the recombination and at the same time offers increased mechanical stability. In addition, hydrogen conversion and limiting temperature can be set by appropriately adjusting the honeycomb geometry.

In one particularly advantageous embodiment of the invention, the body that can be flowed through has coaxially arranged flow channels. Therefore it can also be used in (forced) flow systems, such as, for instance, pipes, without excessively inhibiting flow through the system.

In the framework of the invention, a catalyst system was found in which the input of a body that can be flowed through is arranged at the output of the other body that can be flowed through. Such a catalyst system is particularly well suited for completely eliminating hydrogen from the gas flow in a (forced) flow system without igniting the gas with the heat from the recombination. Hydrogen that is not processed by the first body that is flowed through due to its self-limiting factor travels to the second or a further body that can be flowed through that has less hydrogen and therefore is not as hot as the first one. The hydrogen is processed there. Thus, processing of a large supply of hydrogen is automatically divided among a plurality of bodies that can be flowed through such that the catalyst system also heats up evenly. The total conversion by the system is the additive result of the individual conversions.

The bodies that can be flowed through are advantageously arranged one above the other. This accelerates the gas flow through the catalyst system due to the thermal lift. Thus, the overall system can process more hydrogen per unit of time.

In the framework of the invention, an arrangement was found made of a housing that is flowed through and an inventive body that can be flowed through or a catalyst system in which the body that can be flowed through or the catalyst system is arranged transverse to the flow direction within the housing. With such an arrangement, the hydrogen obtained in one gas flow can be completely removed, or at least made leaner until it is below the lower ignition limit, without impeding the flow. This is particularly important in the case of forced-flow systems such as, for instance, exhaust air systems. Such exhaust systems can deaerate rooms in which pressure containers with combustible gases are located or into which combustible gases penetrate as the result of accidents or malfunctions, such as for instance nuclear reactors, garages, and parking garages.

In the framework of the invention, a method was found for producing a catalyst for recombining hydrogen with oxygen. In this method, a catalytically active material is embedded in a matrix made of a metal oxide. It was found that the recombination rate of the resultant catalyst limits itself in such a manner that a previously established temperature is never exceeded. Among the many processes that are necessary for maintaining the recombination, there is at least one that decreases in speed as the temperature rises. Starting at a certain temperature, this process determines the recombination rate of the entire catalyst.

Molybdenum trioxide is advantageously selected for the metal oxide. The matrix made of this metal oxide is only permeable for hydrogen and in addition spontaneously intercalates molecular hydrogen at room temperature, as well. This prevents foreign substances from contaminating the active material during extended standing times, and the recombination also starts at full strength because of this, even at low temperatures.

A noble metal is advantageously selected for the active medium, in particular a noble metal from the group platinum, palladium, rhenium, rubidium, rhodium, and iridium. As is known, these noble metals promote the reaction between hydrogen and oxygen and are therefore comparatively insensitive to contamination by foreign substances from the environment.

In one particularly advantageous embodiment of the invention, a molybdenum trioxide powder is impregnated with a noble metal salt, in particular hexachloroplatinic acid or palladium nitrate. This process is particularly easy to perform on an industrial scale. To convert the noble metal salts into catalytically active elementary noble metal, the powder is advantageously calcined at temperatures below 800° C.

Alternatively, molybdenum trioxide particles can be coated with preformed noble metal nanoparticles from an aqueous dispersion. In this manner the noble metal can be distributed particularly finely on and in the matrix so that less expensive noble metal is required for a given recombination rate for the catalyst than according to the prior art.

In one particularly advantageous embodiment of the invention, an open-pored body is impregnated with a molybdenum trioxide that contains a noble metal. Even locations that are difficult to access in an open-pore body that can be flowed through are reached during the impregnation. Molybdenum oxide that is not deposited in or on the body is not lost, but rather can be re-used for coating the next body.

The body is advantageously brought into contact with a water-based coating suspension. Water is an inexpensive and also environmentally-compatible solvent.

An organic polymer, such as for instance polyacrylic acid, is advantageously added to the coating suspension. This polymer stabilizes the suspension and leads to formation of pores within the layer.

A ceramic bonding agent, for instance in the form of a boehmite sol (AlOOH), is advantageously added to the coating suspension. It bonds the layer containing molybdenum oxide to the substrate surface, in particular when it is advantageously calcined and tempered at temperatures below 800° C. for the purpose of activation.

The subject-matter of the invention shall be explained in greater detail in the following using the figures without this limiting the subject-matter of the invention.

BRIEF DESCRIPTION OF THE DRAWINGS

FIG. 1 depicts arrangements that have catalyst systems and that are being flowed through;

DETAILED DESCRIPTION OF THE INVENTION

Figure 1:
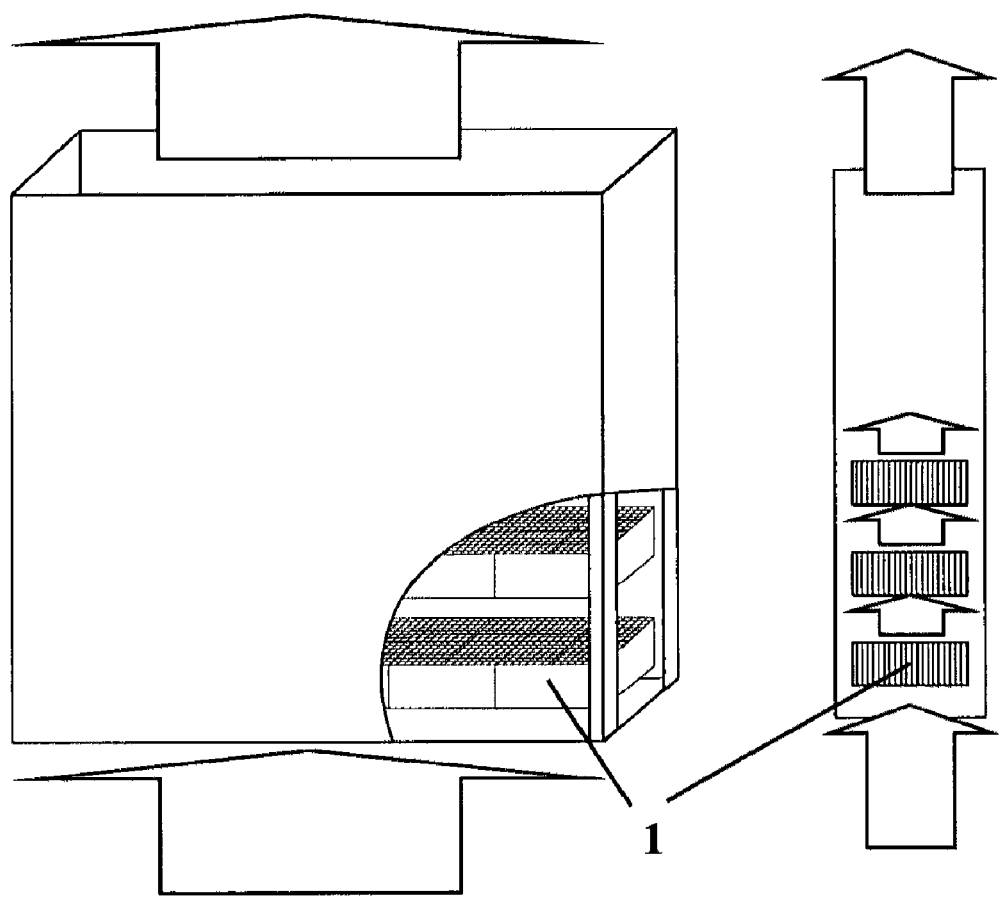

FIG. 1 depicts arrangements having catalyst systems. The arrangements are each being flowed through, the bodies that can be flowed through each being arranged transverse to the direction of flow so that they do not impede the flow. The bodies 1 that can be flowed through are also arranged one above the other so that the flow of the hydrogen-containing gas is thermally accelerated.

Figure 2:
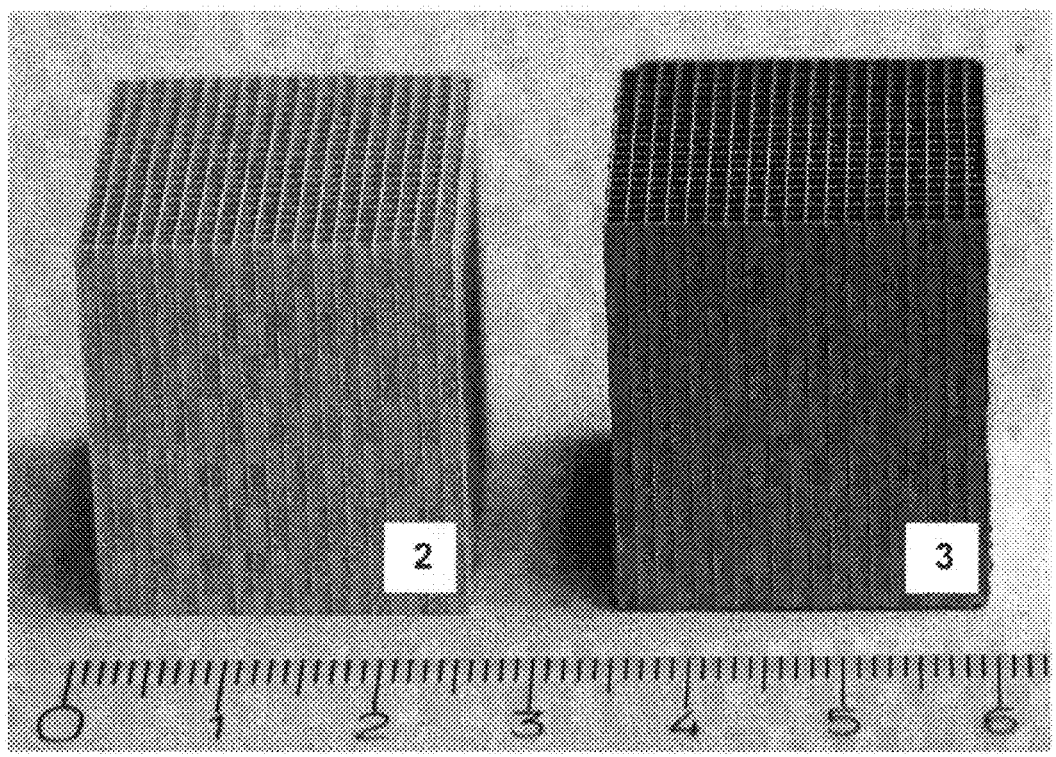
FIG. 2 depicts production of a catalyst.

FIG. 2 provides insight into the production process for an inventive catalyst using an impregnation method. The catalyst in this exemplary embodiment is a body that can be flowed through. The honeycomb-shaped bearing body 2 comprises ceramic cordierite. It is dipped into a water-based coating suspension. For attaining a coating suspension that is suitable both with respect to its stability and viscosity and with respect to its wetting properties and adhesion to the substrate surface, a suitable bonding agent in the form of a boehmite sol (AlOOH) and a suitable suspension agent in the form of organic polymers, for instance polyacrylic acid, are added to the primary suspension (slurry of platinum-activated molybdenum trioxide in water). After the dipping, the excess suspension is removed from the substrate by suctioning.

Fundamentally, all additives that contribute to stabilizing the suspension or forming pores within the layer and to bonding the catalyst to the substrate surface are suitable for producing the liquid coating slip.

The catalyst layer is bonded and fixed by calcination and tempering at temperatures below 800° C.

The impregnated honeycomb body surfaces 3 are dried in the dryer and calcined at a constant heating rate.

The invention claimed is:

1. A catalyst comprising:
   a matrix comprised of a metal oxide; and
   a catalytically active material that supports a recombination of hydrogen and oxygen to water vapor, said catalytically active material being embedded in said matrix, whereby the rate at which at least one of hydrogen and oxygen penetrate the catalytically active material decreases as temperature increases, and the matrix comprised of metal oxide is only permeable for hydrogen.

2. The catalyst according to claim 1, wherein said metal oxide includes molybdenum trioxide.

3. The catalyst according to claim 1, wherein said catalytically active material includes a noble metal.

4. The catalyst according to claim 3, wherein said noble metal is selected from the group consisting of platinum, palladium, rhenium, rubidium, rhodium and iridium.

5. A body that can be flowed through as the catalyst according to claim 1.

6. The body according to claim 5, wherein said body comprises the metal oxide matrix.

7. The body according to claim 6, wherein the body is coated with the metal oxide matrix.

8. The body according to claim 5, wherein said body includes a honeycomb-shaped structure.

9. The body according to claim 5, further comprising coaxially arranged flow channels.

10. A catalyst system, comprising:
    at least two bodies that can be flowed through in accordance with claim 5, wherein the at least two bodies are switched in series.

11. A catalyst system according to claim 10, wherein an input of one of said at least two bodies is arranged at an output of an other of said at least two bodies.

12. An arrangement of a housing that is flowed through in combination with a body that can be flowed through in accordance with claim 5 or a catalyst system in accordance with claim 10, wherein the body that can be flowed or the catalyst system is arranged transverse to a flow direction within the housing.

13. A body that can be flowed through, which body is a catalyst, the body comprising coaxially arranged flow channels, the catalyst comprising a matrix comprised of a metal oxide and a catalytically active material that supports a recombination of hydrogen with oxygen, said catalytically active material being embedded in said matrix.

14. A catalyst system comprising at least two bodies, which at least two bodies are catalysts which can be flowed through, wherein the at least two bodies are switched in series, the catalysts comprising a matrix comprised of a metal oxide and a catalytically active material that supports a recombination of hydrogen with oxygen, said catalytically active material being embedded in said matrix.

15. An arrangement of a housing that is flowed through in combination with a body that can be flowed through, which body is a catalyst, wherein the body that can be flowed through is arranged transverse to a flow direction within the housing, the catalyst comprising a matrix comprised of a metal oxide and a catalytically active material that supports a recombination of hydrogen with oxygen, said catalytically active material being embedded in said matrix.

16. An arrangement of a housing that is flowed through in combination with at least two bodies that can be flowed through, which at least bodies are catalysts, wherein the at least two bodies are arranged transverse to a flow direction within the housing, the catalyst comprising a matrix comprised of a metal oxide and a catalytically active material that supports a recombination of hydrogen with oxygen, said catalytically active material being embedded in said matrix.

17. A catalyst system according to claim 14, wherein an input of one of said at least two bodies is arranged at an output of an other of said at least two bodies.

* * * * *